United States Patent
Mayhew, Jr. et al.

[11] 3,807,669
[45] Apr. 30, 1974

[54] COVERED CROSS RUNWAY CHANNEL FOR AIRCRAFT ARRESTING SYSTEM

[75] Inventors: Harry E. Mayhew, Jr.; William R. Schlegel, both of Wilmington, Del.

[73] Assignee: All American Industries, Inc., Wilmington, Del.

[22] Filed: Feb. 10, 1972

[21] Appl. No.: 225,083

[52] U.S. Cl............................................ 244/110 C
[51] Int. Cl............................................. B64f 1/02
[58] Field of Search............ 244/110, 114 R, 110 C, 244/110 R; 404/2, 4, 5

[56] References Cited
UNITED STATES PATENTS

| | | | |
|---|---|---|---|
| 2,436,593 | 2/1948 | Moselowitz | 404/4 |
| 2,649,720 | 8/1953 | Heltzel | 404/2 |
| 3,058,703 | 10/1962 | Fonden et al. | 244/110 R |
| 3,645,177 | 2/1972 | Hargett | 404/2 |
| 3,726,498 | 4/1973 | Schlegel | 244/110 C |
| 3,146,974 | 9/1964 | Petoia | 244/110 C |
| 3,191,891 | 6/1965 | Fonden et al. | 244/110 C |
| 2,844,340 | 7/1958 | Daniels et al. | 244/110 C |
| 3,167,277 | 1/1965 | Cotton | 244/110 C |

Primary Examiner—Trygve M. Blix
Assistant Examiner—Paul E. Sauberer
Attorney, Agent, or Firm—Connolly and Hutz

[57] ABSTRACT

A row of covered channels are installed within an airport runway under a cross runway pendant and between a series of pitted pendant supporting and retaining devices. The lids of the channels are aligned with the surface of the runway and have depressed grooves for receiving the pendant when it is pushed down under the wheels of an overrunning aircraft. The connected channels conduct water through them and from interposed pit boxes off the runway into drains. Flanges at the ends of the channels connect them to apertured walls of the pit boxes. Heaters in the channels adjacent the grooves maintain them free of ice. Elastomeric slabs of a material, such as polyurethane, having a low coefficient of restitution may cover the lids to help damp wave motion and vibration of the pendant. The lids also absorb and resist the damaging impact. A V-shaped groove facilitates fabrication and operation, and the elastomeric slab as well as the lid under it are removable to facilitate replacement and access to the interior of the channels for maintenance.

17 Claims, 7 Drawing Figures

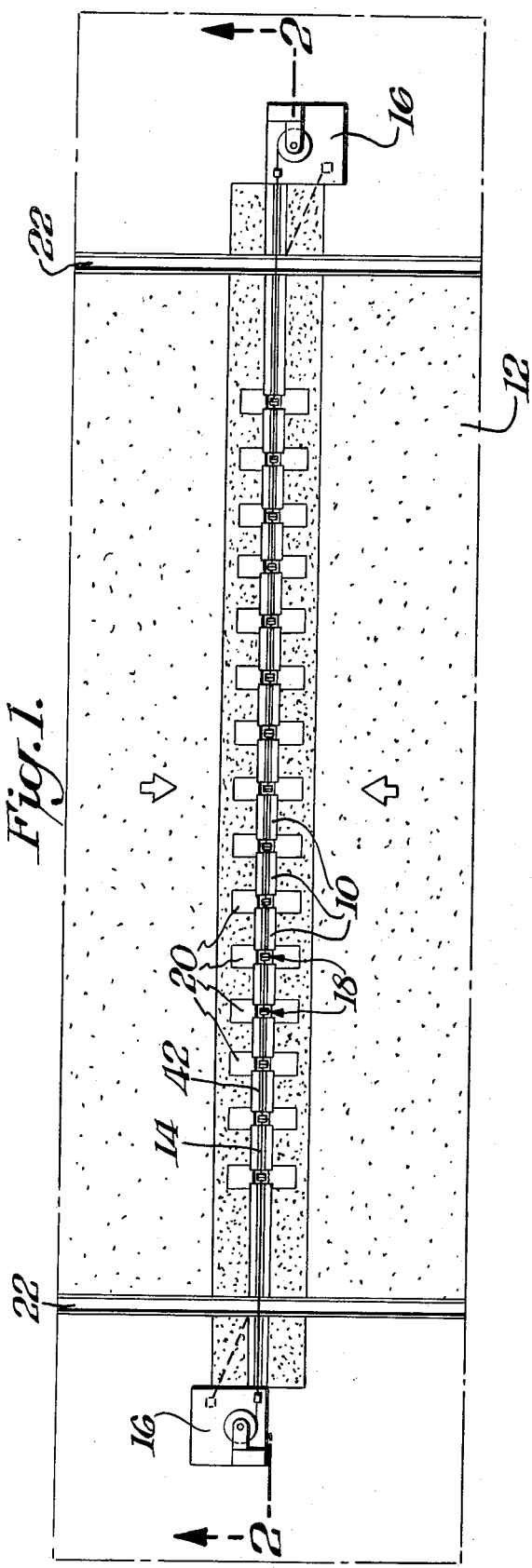

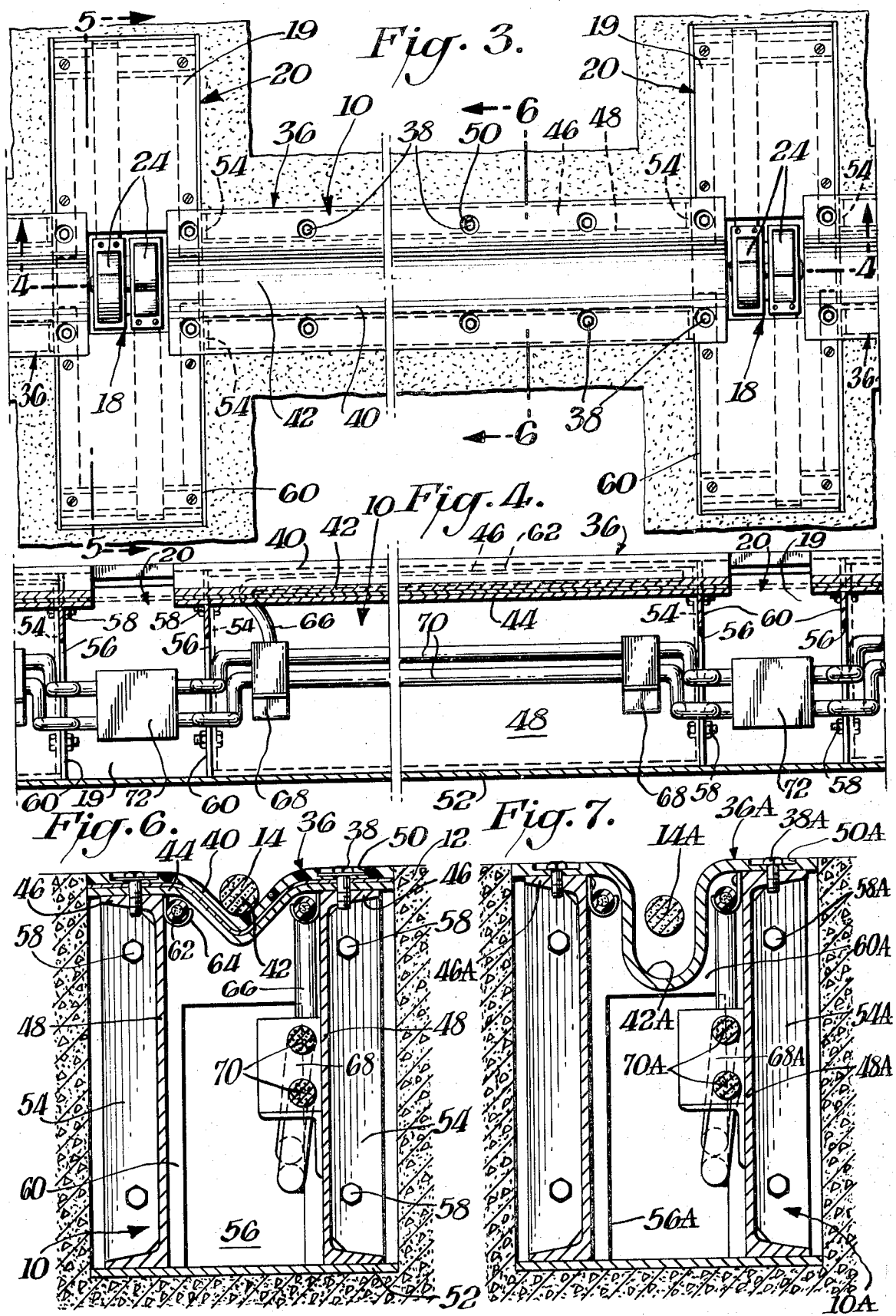

COVERED CROSS RUNWAY CHANNEL FOR AIRCRAFT ARRESTING SYSTEM

BACKGROUND OF THE INVENTION

The area of an airport runway under the cross runway pendant of an aircraft arresting system is usually grooved to receive the pendant and avoid interference with the wheels of overrunning aircraft. These grooves must be heated to maintain them free of ice. Various parts of the aircraft arresting system are installed in pits adjacent the deployed pendant, for example pendant supporting and retaining devices. These pits require electrical connections and underground drains which are subject to freezing and clogging. The heaters for the grooves often require maintenance. Troublesome and expensive removal and replacement of the concrete runway surface is therefore often required. An object of the invention is to provide a cross runway arrangement for an aircraft arresting system which is efficient, durable and which facilitates maintenance without disrupting the runway surface.

SUMMARY

In accordance with this invention, a row of elongated covered channels are installed within a slot in an airport runway under the pendant. The lids of the channels are aligned with the surface of the runway and have depressed grooves for receiving the pendant when it is pushed down under the wheels of an overrunning aircraft. The connected channels conduct water through them and from any interposed equipment-containing pits into drains. Flanges at the ends of the channels accordingly connect them to apertured walls of the pit boxes. Heaters in the channels adjacent the grooves maintain them free of ice. The channels thus contain electrical power cables for the heaters, juction boxes and any other necessary electrical devices. Elastomeric slabs of a shock and abrasion resistant material, such as polyurethane, having a low coefficient of restitution may cover the lids to help damp and resist wave motion and vibration of the pendant. A V-shaped groove facilitates fabrication and operation, and the elastomeric slabs and lids are removable to facilitate replacement and access to the interior of the channels to maintain them free of clogs and to maintain all contained equipment (such as heaters and electrical connections) in operating order.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a top plan view of an airport runway in which an embodiment of this invention is installed under the cross runway pendant of an aircraft arresting system;

FIG. 2 is a cross-sectional view taken substantially through FIG. 1 along the line 2—2 with pit enclosures shown in elevation;

FIG. 3 is a top plan view of a component embodiment of this invention in conjunction with a pair of pendant supporting and retaining devices installed in pits;

FIG. 4 is a cross sectional view in elevation taken through FIG. 3 along the line 4—4 substantially omitting the devices installed in the pits;

FIG. 6 is a cross-sectional view taken through FIG. 3 along the line 6—6; and

FIG. 7 is a cross-sectional view similar to FIG. 6 showing a modified pendant-receiving grooved lid.

DESCRIPTION OF THE PREFERRED EMBODIMENT

Figure 5:
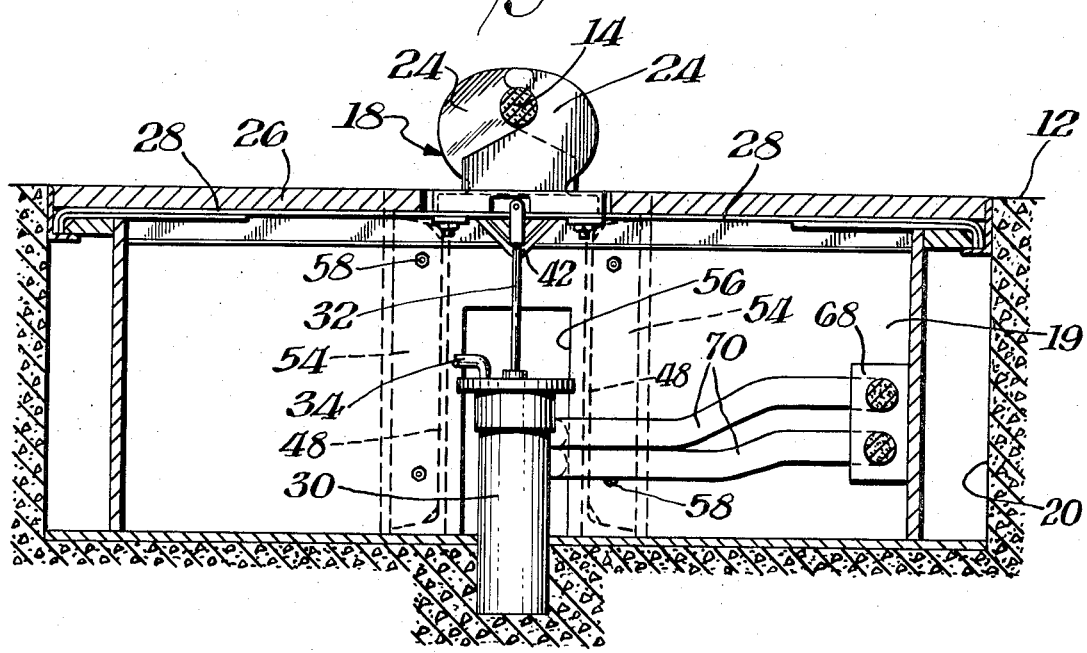
FIG. 5 is a cross-sectional view taken through FIG. 3 along the line 5—5.

In FIGS. 1 and 2 is shown a row of elongated covered channels 10, installed within a crowned airport runway 12 under a cross runway pendant 14, which is for example a wire cable or a nylon braided rope as described in U.S. Pat. No. 3,456,908. Pendant 14 extends between energy absorbers 16 of an aircraft arresting system, which are for example of the type described in U.S. Pat. No. 3,172,625 utilizing a linear tape.

Runway 12 is for example about 100 to 150 feet wide, and a row of pendant supporting and retaining devices 18 are interposed in the same row as covered channels 10. Devices 18 are mounted in boxes 19 in covered pits or slots 20, which are connected to each other by covered channels 10 as later described herein and in commonly assigned U.S. Pat. Application Ser. No. 201,350, filed Nov. 23, 1971 of which one of the coinventors of this present application is the inventor.

As shown in FIG. 2, channels 10 connect the lower portions of pit boxes 19 with drains 22 at the sides of runway 12. The central crown of runway 12 indicated by the convexity in FIG. 2 facilitates the flow and drainage of water from pit boxes 19 through channels 10 to drains 22. The length of channels 10 vary, depending on the spacing of pits 20, which are disposed closer to each other toward the centrally crowned or raised middle area of runway 12.

As shown in FIGS. 3 and 5, devices 18 include pairs of flexible jaws 24 which hold pendant 14 at an aircraft arresting height above surface of runway 12 and apertured cover 26 over pit 20. Pendant 14 is snatched from jaws 24 by a hook on an aircraft (both not shown) when it is arrested by pendant 14 and its associated apparatus. Jaws 24 are made of an elastomer, such as polyurethane or neoprene, and are mounted on leaf spring arms 28. Assembled jaws 24 and arms 28 are connected to shock-absorbing cylinder 30 by connecting rod 32 to damp the wave motion and vibration of pendant 14 when it is pushed down under the wheels of an overrunning aircraft. Conduit 34 is connected by cylinder 30 for admitting air to pull arms 28 and jaws 24 downwardly and release pendant 14.

FIGS. 3–6 show the details of covered channels 10 interposed between pit boxes 19. Devices 18 are omitted from pits 20 and inner boxes 19 in FIGS. 4 and 6 to facilitate the description of channels 10. Each channel 10 includes a removable lid 36 secured by cap screws 38. Lid 36 is covered by slab 40 of elastomeric material having a relatively low coefficient of restitution or high hysteresis, which helps damp the wave motion of pendant 14 when it is bounced downwardly under the wheels of an overrunning aircraft. Lid 36 has a central longitudinal groove 42, for example, V-shaped, for receiving pendant 14 when it is pulled down to avoid overrunning wheels. A suitable low resilience, highly abrasion resistant covering slab 40 having a low coefficient of restitution comprises a polyurethane polymer and a suitable curing agent having the following characteristics and useful ranges:

1. Polymer — No. 6005 Polyurethane synthetic rubber from Uniroyal Chemical Company, Naugatuck, Connecticut 06771 — 100 parts by weight;
2. Curing Agent — 4.4 Methylene-bis-(2-chloroaniline)- 95 parts by weight — Percent equivalent (theoretical) 95–98%;
3. Mixing Temperature — 212° "F";
4. Curing Temperature & Time — 212°F for 3 hours;
5. Hardness — 70 Durometer A, ranging from 68 to 72;
6. Tensile Strength — 6,000 pounds per square inch, ranging from 5,500 to 6,500;
7. Elongation at Break — 500 percent, ranging from 420 to 580;
8. Tear — 300 pounds ASTM-D-470; ranging from 280 to 320;
9. Impact Strength (IZOD, Notched) Flexed no fracture;
10. Abrasion Resistance, Labor H-18 Wheel — 1,000 gram weight/gram loss 1,000 revolutions — 0.018 ranging from 0.016 to 0.020;
11. Resilience (Bashore) — 8%, ranging from 6 to 10%; and
12. Compression Set, Method B — 10%; ranging from 8 to 10%.

Covering slab 40 is for example bonded or is inherently stiffened to keep it close to base steel lie 44 under cap screws 38. Lid 36 is secured by cap screws 38 to upper flanges 46 of side channels 48 of channels 10. Cap screws 38 extend through countersunk recesses 50 in cover slabs 40 to firmly secure them to channels 10. Each channel 10 includes base plates 52 and side channels 48 from which end flanges 54 extend. Flanges 54 of channels 10 are secured by nuts and bolts 58 to elongated end walls 60 of boxes 19, which line pits 20. Elongated lining end walls 60 have apertures or ports 56 to permit pit boxes 19 to drain through channels 10.

Heater rods 62 are mounted on either side of pendant-receiving groove 42 in brackets 64 inside the tops of channels 10 on side channels 48. Heaters 64 are connected by electrical cables 66 to one of junction boxes 68 to which electrical power supply cables 70 extending through channels 10 are connected. Cables 70 are connected to similar electrical junction boxes 72 in pits 20. Channels 10 therefore provide a convenient conduit for supplying electrical power to pits 20. Heaters 62 maintain grooves 42 free of ice and therefore permit pendant 14 to move freely in and out of grooves 42 under sub-freezing conditions.

Channels 10A shown in FIG. 7 is similar to channel 10, with the exception that groove 42A is deep U-shaped and that lid 36A is bare steel with no protective slab over it. It therefore lacks the described functions of cover slab 40.

Removable lid 36 provides rapid free access to the interior of channels 10 when any replacement or maintenance is necessary to heaters 62, cables 66 or 70 or to free drainage obstructions. This avoids the previously required troublesome and expensive removal and replacement of concrete-imbedded heaters or drains. Slabs 40 of abrasion resistant polyurethane resist the damaging vibration and wave motion of pendant 14. The polyurethane cover prevents deleterious rebound and sparking, which is experienced from a bare steel lid, such as 36A. Covered channels 10 therefore provide an unexpected variety of functions and advantages.

We claim:

1. A covered cross runway channel for installation under a cross runway pendant of an aircraft arresting system comprising an elongated channel having open ends for installation within an airport runway under said pendant, a removable lid on said channel, a pendant-receiving groove in said lid, said open ends of said elongated channel facilitating drainage through said elongated channel, and an elastomeric slab of material being disposed upon said lid for absorbing wave motion and vibration of said pendant.

2. A cross runway installation for an aircraft arresting system having a cross runway pendant deployed across said runway comprising a row of elongated covered channels as set forth in claim 1, said row of elongated channels being installed in a slot within said runway under said deployed pendant, said lids of said elongated channels being substantially aligned with the surface of said runway, said grooves being disposed below said runway surface for receiving said pendant and avoiding the wheels of overrunning aircraft, said ends of adjacent channels communicating with each other, the outer end channels in said row being lower than centrally disposed channels for causing any water in said channels to drain to the sides of said runway, drains at the sides of said runway adjacent the outer end channels of said row, and said outer end channels communicating with said drains for draining any water in said row of channels into said drains.

3. An installation as set forth in claim 2 wherein elastomeric material has a low coefficient of restitution whereby said wave motion and vibration are damped.

4. An installation as forth in claim 3 wherein said elastomeric material comprises polyurethane having a low resilience and high abrasion resistance.

5. An installation as set forth in claim 4 wherein said polyurethane has a resilience (Bashore) ranging approximately from 6 to 10%.

6. An installation as set forth in claim 2 wherein said groove is V-shaped.

7. A channel as set forth in claim 1 wherein said elastomeric material has a low coefficient of restitution whereby said wave motion and vibration are damped.

8. A channel as set forth in claim 7 wherein said elastomeric material comprises polyurethane having low resilience and high abrasion resistance.

9. A channel as set forth in claim 8 wherein said polyurethane has a resilience (Bashore) ranging approximately from 6 to 10%.

10. A channel as set forth in claim 1 wherein said groove is V-shaped.

11. A channel as set forth in claim 1 wherein flanges are disposed on said open ends to provide a means for connecting said channel to another said channel.

12. A cross runway installation for an aircraft arresting system having a cross runway pendant deployed across said runway comprising a row of elongated covered channels, said elongated channels having open ends for installation within an airport runway under said pendant, a removable lid on said channels, a pendant-receiving groove in said lid, said open ends of said elongated channels facilitating drainage through said elongated channels, said row of elongated channels being installed in a slot within said runway under said deployed pendant, said lids of said elongated channels being substantially aligned with the surface of said runway, said grooves being disposed below said runway surface for receiving said pendant and avoiding the wheels of overrunning aircraft, said ends of adjacent channels communicating with each other, the outer end channels in said row being lower than centrally disposed channels for causing any water in said channels to drain to the sides of said runway, drains at the sides of said runway adjacent the outer end channels of said row, and said outer end channels communicating with said drains for draining any water in said row of channels into said drains.

13. An installation as set forth in claim 12 wherein at least one pit is interposed in said runway within said row of elongated channels, said pit containing a portion of said aircraft arresting system, apertures in said pits in line with said row of channels and said open ends of said channels adjacent said pit being connected to said pit at said apertures for draining water from it.

14. An installation as set forth in claim 13 wherein a pendant supporting and retaining device is disposed in said pit.

15. An installation as set forth in claim 14 wherein a number of said pendant supporting and retaining devices and pits are disposed across said runway and interposed within said row of elongated channels.

16. An installation as set forth in claim 15 wherein heaters are disposed in said channels adjacent said grooves for maintaining said grooves free of ice.

17. An installation as set forth in claim 16 wherein a pair of elongated heaters are mounted on upper portions of said side walls of each of said channels on both sides of said groove.

* * * * *